Figure 1:
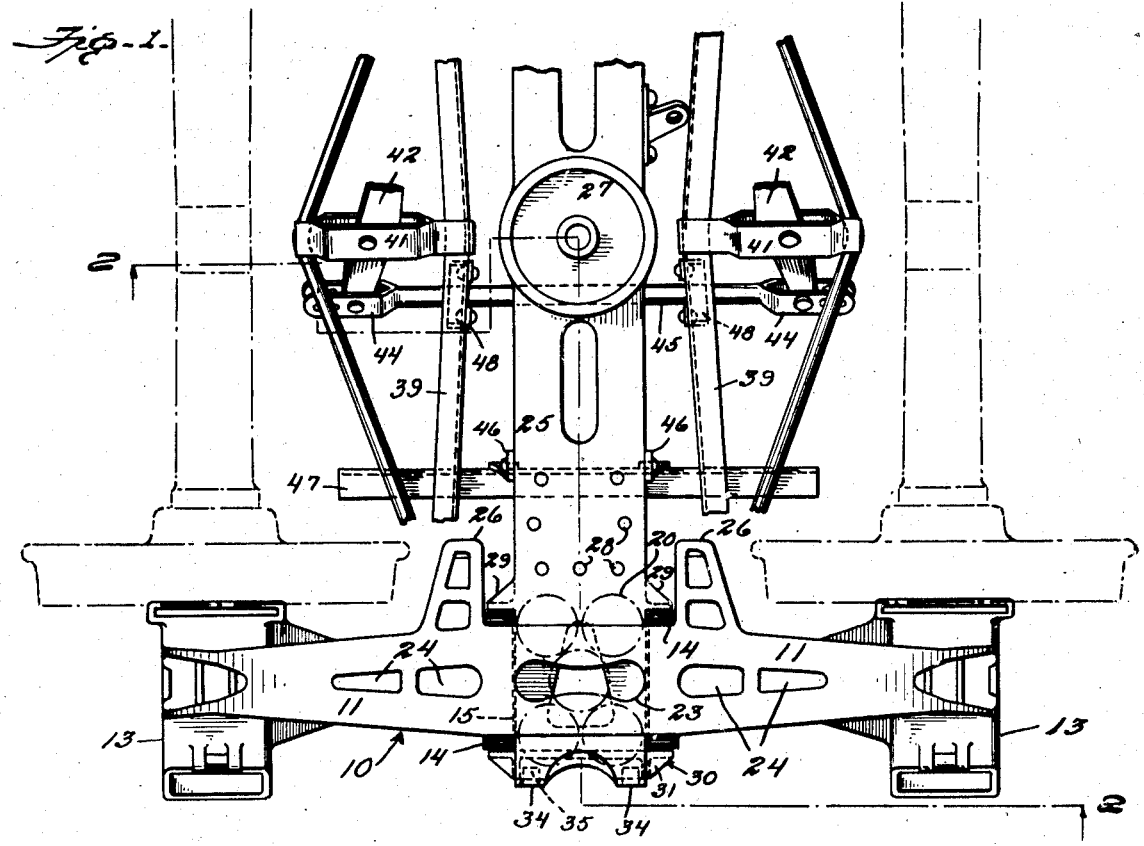

Dec. 4, 1934.  T. H. SYMINGTON  1,982,704
RAILWAY CAR TRUCK
Filed July 31, 1930  2 Sheets-Sheet 1

Inventor
Thomas H. Symington
By John Milton Jester
Attorney

Dec. 4, 1934.  T. H. SYMINGTON  1,982,704

RAILWAY CAR TRUCK

Filed July 31, 1930  2 Sheets-Sheet 2

Inventor
Thomas H. Symington
By John Milton Jester
Attorney

Patented Dec. 4, 1934

1,982,704

UNITED STATES PATENT OFFICE 1,982,704

RAILWAY CAR TRUCK

Thomas H. Symington, Baltimore, Md., assignor to T. H. Symington & Son, Inc., Baltimore, Md., a corporation of Maryland Application July 31, 1930, Serial No. 472,116

17 Claims. (Cl. 105—197)

The invention relates to railway car trucks and has for its general object the provision of a truck of such construction as to eliminate the usual spring plank and thereby not only reduce the weight of the entire assembly, and cut down the necessary number of parts, but also obviate the disadvantages which result from manufacturing variations in spring planks, it being well known that unless the spring plank be of exactly the proper length "cocking" or canting of the side frames is caused.

Another object of the invention is to provide a truck in which the spring plank is eliminated without being replaced by a tie rod or other means of a similar nature connecting the side frames, means being provided on the truck bolster and cooperating with the side frames for preventing relative displacement.

Another object of the invention is to provide a truck in which the side frames are of special form to provide increased bearing contact with the truck bolster so as to insure a ninety degree relation between the side frames and the bolster, or in other words to maintain squaring of the parts, said increase in the bearing surfaces also distributing the wear so that the parts will have a longer life.

Another important object of the invention is to provide a truck of this character having novel and easily removable means holding the side frames and truck bolster in connected relation whereby upon removal of this means, subsequent to removal of the truck from beneath the car and jacking to take the weight off the truck springs, the side frames may be easily pulled off to permit removal and replacement of the wheels, the operation being greatly simplified as compared with the effort involved in handling the standard type of truck.

Another object is to provide a truck assembly in which the truck springs may be arranged with the longitudinal axis of the nest extending longitudinally with respect to the truck bolster so that a greater number of springs may be located within the narrow confines of the window opening and so that not only greater spring capacity but also greater stability may be had.

A further object is to provide a truck equipped with novel safety supporting means mounted beneath the brake beams for catching and holding the latter in the event of breakage of the brake hanger, bracket or hanger pin, it being an added feature that this safety means be carried directly by the truck bolster.

Another detailed object is to provide a truck which is equipped with a safety support for the brake rods so that they cannot fall down onto the roadbed in the event of disconnection of any of the joints, it being an added feature that this means may be carried directly by the brake beams themselves.

Still another object is to provide a truck in which the elimination of the spring plank makes it possible to use a bolster of greater depth and consequently greater cantilever strength capable of withstanding severe strains and stresses.

An additional object is to provide a truck embodying the above outlined advantages and which will at the same time be simple and inexpensive to make, easy to assemble and disassemble, positive in action, efficient and durable in service, and a general improvement in the art.

Figure 2:
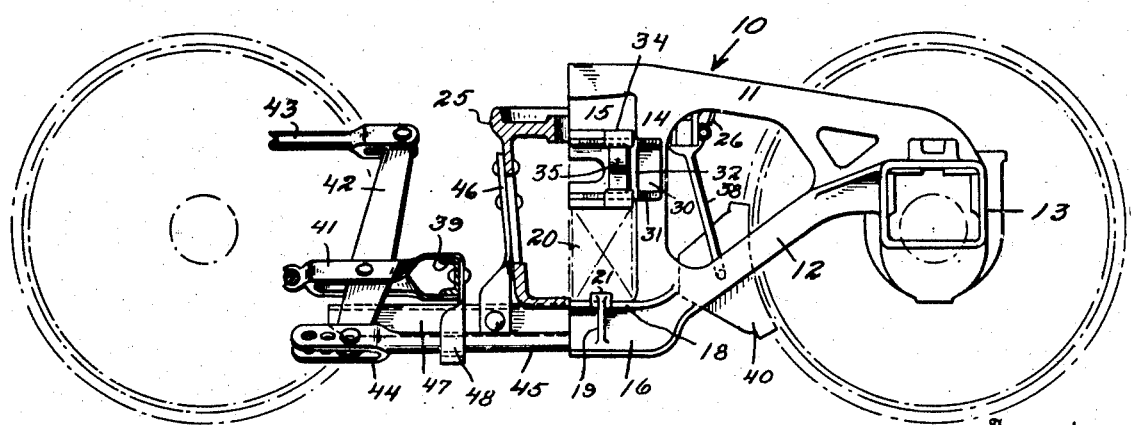
Figure 3:
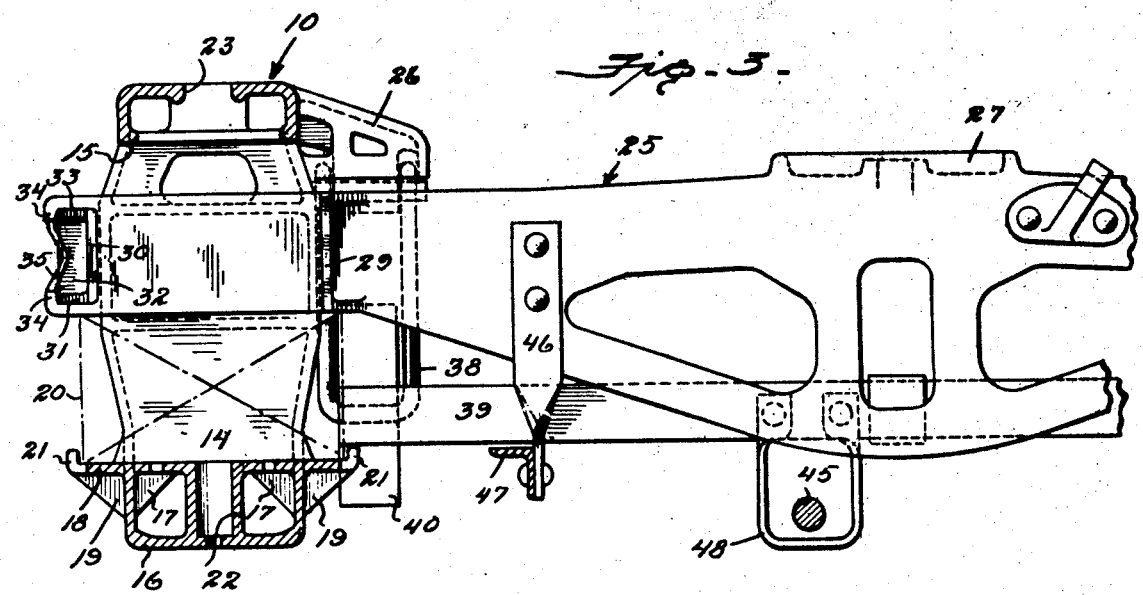
Figure 4:
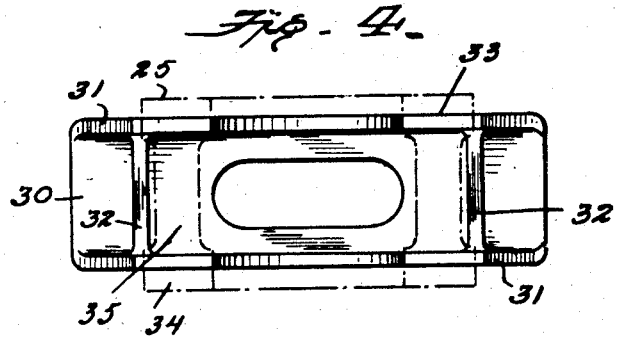
Figure 5:
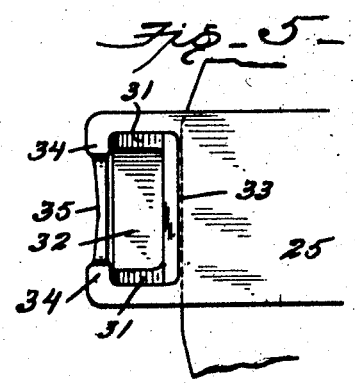
Figure 6:
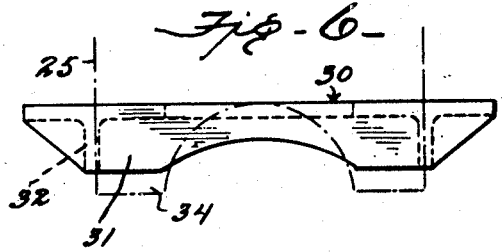
Figure 7:
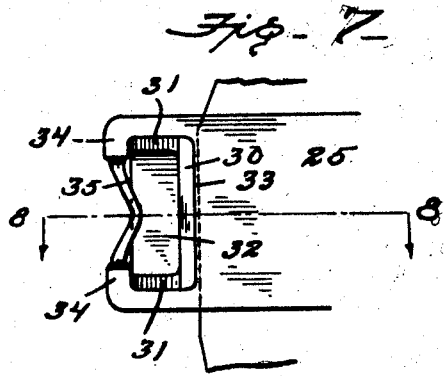
Figure 8:
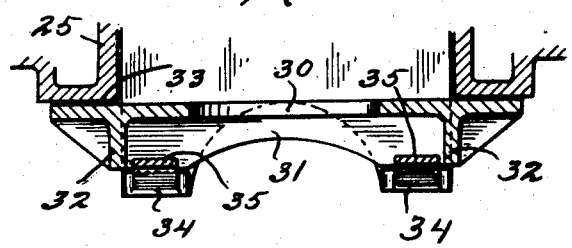

To the attainment of the foregoing and other objects and advantages, the invention preferably consists in the details of construction and the arrangement and combination of parts to be hereinafter more fully described and claimed, and illustrated in the accompanying drawings in which:

Figure 1 is a top plan view of a truck constructed in accordance with my invention, a portion or one side being omitted, Figure 2 is a view taken on the line 2—2 of Figure 1, Figure 3 is a vertical cross section through one side frame and showing the truck bolster in elevation, Figure 4 is an end elevation of the truck bolster, shown in dot and dash lines, and showing in full lines the retaining member associated therewith, Figure 5 is a side elevation thereof with the bolster in full lines and showing the condition prior to securing the retaining member against movement, Figure 6 is a plan view of what is shown in Figure 4, Figure 7 is a view similar to Figure 5 but showing the condition when the retaining member is secured against displacement, and Figure 8 is a section taken on the line 8—8 of Figure 7.

Referring more particularly to the drawings, I have shown my truck as comprising side frames indicated as a whole by the numeral 10, only one being shown as it is obvious that there must be two, one at each side of the truck. The side frame is represented as comprising a compression member 11, and a tension member 12 merging at one end into a journal box structure 13 and connected by column guides 14 which are spaced apart to define the window opening 15. The lower ends of the tension members 12 merge into the bottom tie portion 16 which is disclosed as preferably of closed box-like rectangular form in cross section provided interiorly with reinforcing webs 17. At the sides, this bottom tie portion is formed with lateral extensions 18 beneath which are webs 19 merging thereinto and into the sides of the tie portion, these flanges being flush with the top surface of the bottom tie portion and these flush surfaces constitute a seat for a nest or group of truck springs indicated diagrammatically at 20. The nest is prevented from lateral displacement by the opposed faces of the column guides and from longitudinal displacement by upturned lips 21 at spaced points on the flanges 18. The very center of the bottom tie portion 16 may be formed as a spool-like casting 22. It is also preferable that the flanges 18 merge into the sides of the tension members outwardly of or beyond the column guides as clearly illustrated in Figure 2 for the sake of strength. The exact construction at the center of the top of the side frame is perhaps of somewhat minor importance, compared with other details to be described, but it will be observed that this top portion is of inverted channel shape in cross section and formed with an opening 23 for reducing the weight. Other openings 24 may be provided at intervals for the same purpose.

An important feature, the purpose of which will be hereinafter brought out more specifically, is the fact that the combined width of the bottom tie portion and the flanges 18 is considerably greater than the spring seat or spring plank seat on a standard type of side frame, and the further fact that the column guides 14 are swelled out or enlarged laterally, or widened, with respect to the width or thickness of the major portion of the side frame. The purpose of this is to provide large bearing areas at the sides of the window opening through which the end of the bolster, indicated as a whole by the numeral 25, extends. The confronting faces of the column guides are, as is usual, vertical and therefore parallel.

Furthermore, the side frame is formed at each side of the window opening or column guides with brake hanger brackets 26 which may, if desired, be of the detailed construction illustrated in my co-pending application for patent for Brake hanger mountings, filed September 24, 1930, Serial No. 484,177. Furthermore, if such is preferred, the entire side frame construction may be identically the same as that disclosed in my co-pending application for patent for Side frames, filed February 5, 1931, Serial No. 513,689.

The truck bolster 25 is of course constructed as a casting in the usual manner and is here disclosed as provided at the center of its top with a center bearing 27 adapted to cooperate with the center plate, not shown, of the body bolster beneath which the truck is located. Inwardly of the side frame the bolster is also shown as having a plurality of holes 28 for the reception of securing members used for mounting any ordinary or preferred type of side bearing thereon. The side bearing is not shown as it forms no part of the present invention. Inwardly of the side frame the bolster is shown as formed at opposite sides with guide lugs 29 which engage against the column guides at the inner face of the side frame so as to prevent relative displacement of the bolster in one direction. Displacement in the other direction is prevented by means of a transverse retaining member 30 shown in detail in Figures 4 to 8 inclusive and represented as comprising a channel member having top and bottom flanges 31 connected by vertically arranged transverse ribs 32. The end of the bolster projects beyond the outer side of the side frame and this projecting end is formed with a transverse slot 33 within which the retaining member 30 is slidably mounted, the outer end of the bolster being open except for pairs of overhanging flanges 34 each connected by a relatively thin or deformable strip or connecting member 35. The strips 35 are normally or initially vertically disposed as in Figures 4 to 6 but after the side frame is engaged upon the end of the bolster and the member 30 inserted through the slot 33, these strips 35 are intended to be forced or bent inwardly, into the position shown in Figures 3, 7 and 8 so as to extend into the open end of the bolster between the vertical transverse ribs 32 on the member 30, it being consequently clear that the member 30 cannot then be moved longitudinally in either direction. The flanges 34 on the end of the bolster overlie the edges of the flanges 31 so as to take the thrust against the member 30, and when the strips 35 are deformed inwardly by the application of requisite force, these flanges 34 will be bent slightly into closely gripping relation to the flanges 31 so that the retaining member 30 cannot shake and rattle.

Actually, the bolster may embody various structural characteristics different from the standard design, for instance as illustrated in my co-pending application for patent for Bolsters, filed October 27, 1930, Serial No. 491,576, but such details are not herein disclosed. It might, however, be mentioned that owing to the absence of any spring plank, it being noted that none is shown, it is possible to make the bolster with a center portion 37 of greater depth than usual, in fact of such depth that if a spring plank were used there would be interference between the parts. The advantage in this added depth is that the bolster has a superior truss action and is better capable of withstanding cantilever strains. The bolster will be maintained square with respect to the side frames owing to the long end portions bearing against the wide surfaces provided for the column guides, thus compensating for the omission of the spring plank.

Suitably suspended from the brake hanger brackets 26 are hangers 38 carrying the brake beams 39 which are of course equipped with the usual brake shoes 40. The brake beams are connected by means 41 with levers 42 with which are in turn connected rods 43 forming part of the ordinary brake mechanism. These levers are connected with clevises 44 on the brake rods 45. An important feature of the present invention is the provision of safety means located beneath the brake beams for preventing them from dropping down onto the roadbed in case of breakage of any of the parts. This safety means is here shown as comprising brackets 46 riveted or otherwise secured upon the sides of the bolster 25 and carrying angle bars 47 which are located beneath the brake beams and which extend transversely of the bolster. Moreover, I have shown the brake beams as provided with stirrups 48 which surround the brake rods 45 so as to prevent them from ever dropping down.

From the foregoing it is believed that the construction of the truck will be readily apparent.

Attention is again directed to the fact that there are numerous advantages resulting from my construction which permits the elimination of the spring plank. There is one part less and the cost of the truck is therefore reduced. Spring planks are subject to manufacturing variations and therefore frequently cause cocking of the side frames and this in turn results in unequal loading of the axles. By omitting the spring plank there is nothing to throw the side frames out of plumb and there is consequently an even distribution of the load on the axle journals and journal wedges so that there will be less likelihood of hot boxes. At the same time there has been provided an increase in the bearing areas on the bolster and side frames so that squaring will be insured and so that the wear, being distributed over larger areas, will be less destructive. A distinct feature of importance is that my truck construction greatly facilitates the removal of the wheels, the operation of which is as follows: The truck is removed from the car, the bolster jacked up and set on a suitable block, subsequently to which the strips 35 are bent out so that the retainer 30 may be removed, after which the side frame may be pulled off from the ends of the bolster and the axles. The only other thing necessary to do is to take out the pins which mount the brake hangers within the brake hanger brackets, thus letting the brake beams down onto the safety supports 47. There is consequently a great saving in time and labor when wheel replacement is necessary. From the above it is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A truck comprising, in combination, side frames provided with spaced column guides defining window openings, a bolster located between and having its end portions extending through said window openings, and increased bearing means on the truck bolster and the side frames cooperating to insure squaring, said bearing means having their areas smooth, unbroken or continuous and parallel throughout, and means on the bolster cooperating with the outer and inner sides of the side frames for preventing relative lateral movement between the bolster and side frames.

2. A truck comprising, in combination, side frames provided with spaced column guides defining window openings, a bolster located between and having its end portions extending through said window openings, means on the truck bolster and the side frames cooperating to insure squaring comprising laterally extended substantially parallel bearing portions on the confronting faces of the column guides projecting from both sides thereof and substantially correspondingly elongated bearing surfaces on the sides of the bolster, and means carried by the bolster and engaging the edges of said bearing portions at the inner and outer sides, respectively, of the side frame.

3. A railway car truck comprising the combination of side frames each having a pair of column guides spaced apart to define a window opening, a bolster extending between the side frames and having its ends projecting through and beyond the latter, guide lugs on the bolster engaging against the column guides at the inner sides of the side frames for preventing relative longitudinal movement of the truck bolster in one direction, and removable means carried by the projecting ends of the bolster and retained in place by deformation thereof and cooperating with the column guides at the outer sides of the side frames for preventing relative movement in the other direction.

4. A railway car truck comprising, in combination, side frames each having column guides spaced to define a window opening, a truck bolster having end portions of reduced height located and extending beyond the window openings, guide lugs on the sides of the bolster cooperating with the column guides at the inner sides of the side frames for preventing movement of the bolster with respect to the side frames in one direction, detachable channel shaped members engaged within the projecting ends of the bolster and cooperating with the column guides at the outer sides of the side frames for taking the end thrust and preventing movement in the other direction, and means engaging within the channel shaped members for holding the same against displacement.

5. A railway car truck comprising, in combination, side frames each formed with spaced column guides defining a window opening, a truck bolster having its ends extending through and beyond the window openings, means on the truck bolster cooperating with the column guides at the inner sides of the side frames for taking the end thrust on the bolster in one direction, the projecting ends of the bolster being slotted, transversely arranged channel shaped retaining members removably mounted within the slots with their open sides outermost, and means integral with the bolster entering the channel for preventing longitudinal movement of the retaining members.

6. A railway car truck comprising, in combination, side frames each formed with spaced column guides defining a window opening, a truck bolster having its ends extending through and beyond the window openings, means on the truck bolster cooperating with the column guides at the inner sides of the side frames for taking the end thrust on the bolster in one direction, the projecting ends of the bolster being slotted, transversely arranged retaining members removably mounted within the slots, means for preventing longitudinal movement of the retaining members, comprising keeper elements on the bolster embracing the retaining members and coacting elements on the retaining members engageable by the keeper elements.

7. A railway car truck comprising, in combination, side frames each formed with spaced column guides defining a window opening, a truck bolster having its ends extending through and beyond the window openings, means on the truck bolster cooperating with the column guides at the inner sides of the side frames for taking the end thrust on the bolster in one direction, the projecting ends of the bolster being slotted, transversely arranged retaining members removably mounted within the slots, and means for preventing longitudinal movement of the retaining members comprising deformable keeper means on the bolster and elements on the retaining member engageable by said deformable keeper means for preventing movement of the retaining member transversely of the bolster.

8. In a railway car truck, the combination of side frames each having spaced column guides defining a window opening, a truck bolster having its ends extending through and projecting beyond the window openings, means on the sides of the truck bolster cooperating with the column guides at the inner sides of the side frames for preventing relative movement in one direction, the projecting ends of the bolster being formed with transverse slots intermediate the top and bottom thereof, retaining members removably engaged through said slots and abuttingly engaging against the column guides at the outer sides of the side frames, and means formed integrally upon the ends of the bolster engaging within said retaining members for preventing movement thereof with respect to the bolster.

9. In a railway car truck, the combination of side frames each having spaced column guides defining a window opening, a truck bolster having its ends extending through and projecting beyond the window openings, means on the sides of the truck bolster cooperating with the column guides at the inner sides of the side frames for preventing relative movement in one direction, the projecting ends of the bolster being formed with transverse slots, retaining members removably engaged through said slots and abuttingly engaging against the column guides at the outer sides of the side frames, and means formed integrally upon the ends of the bolster cooperating with said retaining members for preventing movement thereof with respect to the bolster comprising deformable elements located outwardly of the retaining members, the retaining members having portions engageable by the deformable elements subsequent to deformation thereof.

10. In a railway car truck, the combination of side frames each having spaced column guides defining a window opening, a bolster having its end portions extending through and projecting beyond said window openings, means on the bolster cooperating with the column guides at the confronting sides of the side frames for preventing relative movement of the side frames and bolster in one direction, the projecting ends of the bolster being horizontally transversely slotted, retaining members engaged through said slots and having vertical webs, and means for preventing subsequent movement of the retaining members transversely of the bolster comprising deformable strips on the ends of the bolster traversing the slot and adapted to be forced into engagement with said webs.

11. In a railway car truck, the combination of a pair of unconnected side frames each having a window opening therein defined between spaced column guides, a truck bolster having its end portions extending through and projecting beyond said window openings, means carried by the truck bolster cooperating with the side frames at the outer and inner sides thereof for preventing relative lateral movement between the bolster and side frames, and said side frames and said bolster having their contacting portions flat and substantially parallel and greatly increased in area as compared with side frames and bolsters of standard design to insure squaring of the bolster with respect to the side frames.

12. In a railway car truck, the combination of side frames each having spaced column guides defining a window opening, a bolster having its end portions extending through and projecting beyond said window openings, the projecting ends of the bolster having transverse openings therethrough, retaining members engaged through said openings and having projecting portions, and means integral with the bolster and engaging said projecting portions for preventing movement of the retaining member transversely of the bolster.

13. In a railway car truck, the combination of side frames each having spaced column guides defining a window opening, a bolster having its end portions extending through and projecting beyond said window openings, the projecting ends of the bolster being horizontally transversely slotted, retaining members engaged through said slots and having vertical webs, and means for preventing movement of the retaining members transversely of the bolster comprising means on the ends of the bolster engaging said webs.

14. In a railway car truck, the combination of side frames each having spaced column guides defining a window opening, a bolster having its end portions extending through and projecting beyond said window openings, the projecting ends of the bolster being horizontally transversely slotted, retaining members engaged through said slots, and means integral with the bolster embracing said retaining members and deformable to exert a clamping action thereon to prevent movement of the retaining members with respect to the bolster.

15. In a railway car truck, the combination of side frames each having spaced column guides defining a window opening, the confronting faces of the column guides being extended to project beyond the inner and outer sides of the frame and being smooth, unbroken and continuous, a bolster having its end portions extending through and projecting beyond said window openings, means carried by the bolster abuttingly engaging against the edges of the extensions of the column guides at the inner sides of the frames, and other means carried by the bolster and abuttingly engaging against the edges of the extensions of the column guides at the outer sides of the frames whereby the bolster may constitute the sole means connecting the side frames and whereby the close engagement of the bolster ends with the laterally extended column guides will insure squaring of the truck and enable the usual spring plank to be omitted.

16. In a railway car truck, the combination of side frames each having spaced column guides defining a window opening, the confronting faces of the column guides being extended to project beyond the inner and outer sides of the frame and being smooth, unbroken and continuous, a bolster having its end portions extending through and projecting beyond said window openings, means carried by the bolster abuttingly engaging against the edges of the extensions of the column guides at the inner sides of the frames, and other means carried by the bolster and abuttingly engaging against the edges of the extensions of the column guides at the outer sides of the frames whereby the bolster may constitute the sole means connecting the side frames and whereby the close engagement of the bolster ends with the laterally extended column guides will insure squaring of the truck and enable the usual spring plank to be omitted, said second named means being detachable with respect to the bolster.

17. In a railway car truck, side frames having spaced column guides defining window openings, the sides of the column guides being prolonged or extended laterally beyond the outer and inner sides of the respective frames and being continuous and unbroken, and a bolster constituting the sole connection between the frames and having its ends projecting through and beyond said window openings, the bolster carrying means abuttingly engaging against the edges of the extensions of the column guides at the outer and inner sides of the side frames respectively for preventing lateral movement of the bolster in either direction with respect to the side frames.

THOMAS H. SYMINGTON.